United States Patent [19]

Neeman

[11] Patent Number: 5,456,182

[45] Date of Patent: Oct. 10, 1995

[54] DEVICE FOR TRANSPORTING HANGING LOADS HAVING HOUSING ENCASED RECIRCULATING GROOVED WHEELS

[76] Inventor: Avraham Neeman, Listo de Correos, Centro Colon 1007, San Jose, Costa Rica

[21] Appl. No.: 187,431

[22] Filed: Jan. 26, 1994

[30] Foreign Application Priority Data

Jan. 26, 1993 [IL] Israel ......................................... 104510

[51] Int. Cl.$^6$ ..................................................... B61B 7/00
[52] U.S. Cl. ............................ 104/112; 104/89; 105/150; 105/148; 384/44
[58] Field of Search ............................... 104/112, 113, 104/89, 93; 105/150, 151, 148, 157.1; 384/44

[56] References Cited

U.S. PATENT DOCUMENTS

| 2,132,558 | 10/1938 | Braune et al. | 105/148 |
| 4,278,306 | 7/1981 | Douglas et al. | 384/44 |
| 5,094,549 | 3/1992 | Lyon | 384/44 |

FOREIGN PATENT DOCUMENTS

| 1554769 | 1/1969 | France | 104/112 |
| 514865 | 12/1930 | Germany | 105/148 |
| 964310 | 7/1964 | United Kingdom | 384/44 |

*Primary Examiner*—Robert J. Oberleitner
*Assistant Examiner*—S. Joseph Morano
*Attorney, Agent, or Firm*—Steinberg, Raskin & Davidson

[57] ABSTRACT

A device for hanging loads and transporting them along a suspended cable or rod constructed of a housing having two parallel side walls, a bottom wall with a longitudinal slot, a top wall and two end walls and containing a plurality of identical pulley-like wheels each having a groove in its peripheral face and a breadth, depth and shape allowing it to accommodate the cable or rod, the housing defining inside it a circumferential path which is essentially filled with wheels which freely move in a plane parallel to that of the side walls and around a core member, the arrangement is such that the wheels located in the lower portion of said path which is adjacent to the bottom rest on said cable or rod.

10 Claims, 2 Drawing Sheets

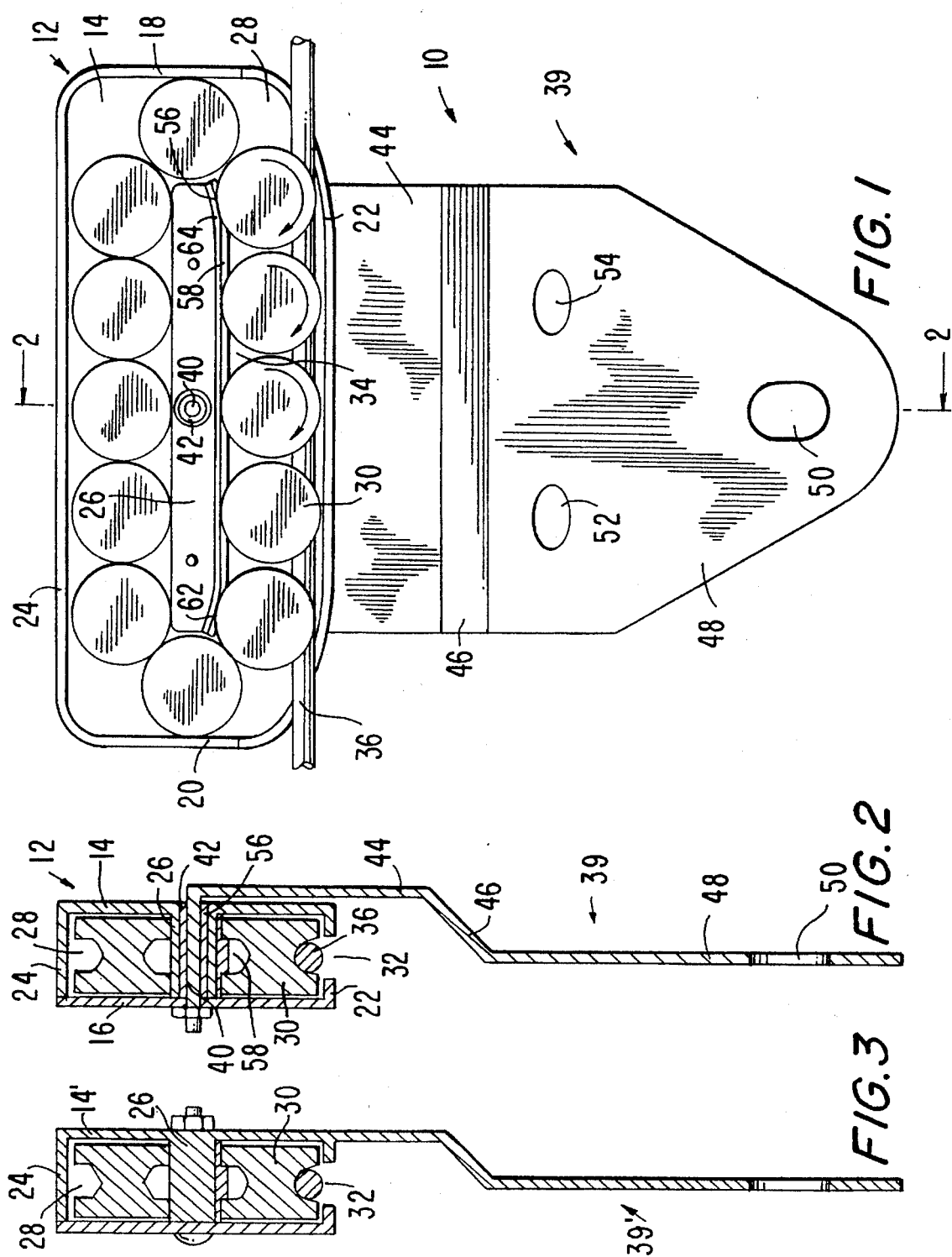

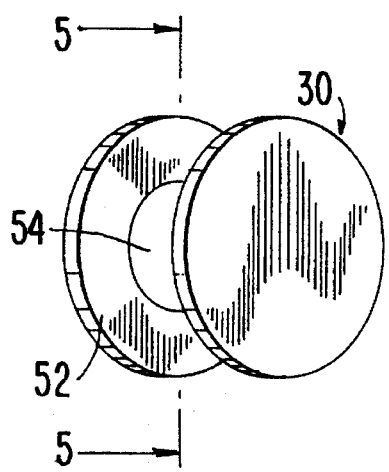
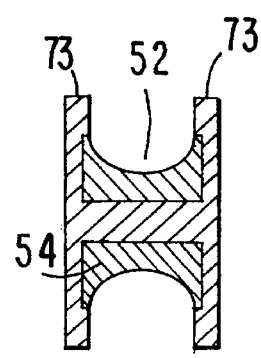
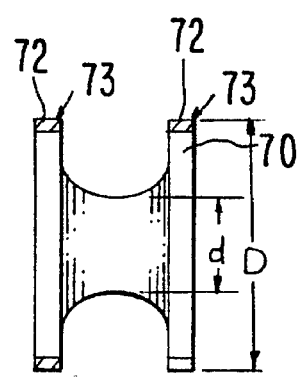
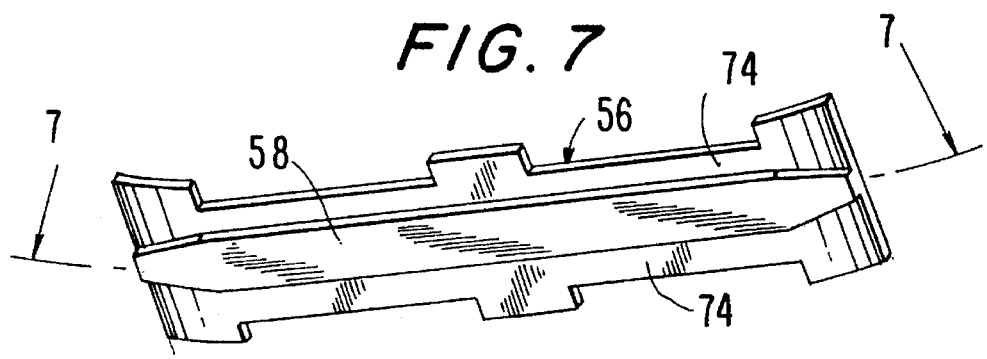
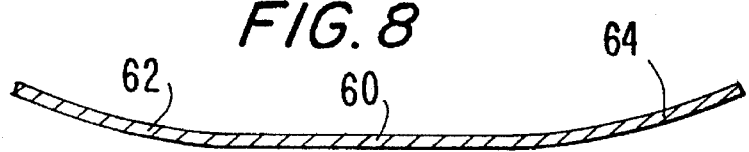

5,456,182

DEVICE FOR TRANSPORTING HANGING LOADS HAVING HOUSING ENCASED RECIRCULATING GROOVED WHEELS

FIELD OF THE INVENTION

The present invention concerns devices adapted for hanging loads and transporting them while hanging along a cable or rod.

BACKGROUND OF THE INVENTION

In various instances it is at times necessary to transport heavy loads from one location to another by using a system of suspended cables or rods and a device adapted to roll over such cables or rods and carry with it a hanging load. Such is the case for example in banana plantations. Banana clusters, typically weigh about 40–50 kilograms and in large plantations it is sometimes necessary to transport them across long distances in the range of hundreds of meters to several kilometers, to a packing and storage house. For this purpose, such a plantation is very often provided with a system of suspended cables, the banana clusters are hinged on such a device which is then rolled over the cables or rods, usually by a train of devices to the storage or packaging house.

Such devices are also used for various other applications such as transporting loads on suspended cables between two banks of a river, transporting heavy parts of machines inside a factory and the like.

Devices of the above kind known today generally have a set of wheels mounted on bearings, each fixed on an axle and when pulled, the wheels roll over and along the cable or rod. However, the problem of such devices is that in view of the heavy loads, the wheels their bearings and axles become rapidly worn out and require frequent maintenance.

It is an object of the present invention to provide an improved device for transporting hanging loads over a suspended cable or rod not using bearings.

SUMMARY OF THE INVENTION

The present invention provides a device adapted for hanging loads and transporting them along a suspended cable or rod, comprising a housing having two parallel side walls, a bottom wall, a top wall and two end walls;

said housing containing a plurality of identical wheels having a width which is narrower than the distance between the two side walls and having each a groove in its peripheral face, the groove having a breadth, depth and shape allowing it to accommodate said cable or rod;

the housing defining inside it a circumferential path, in which the wheels can freely move in a plane parallel to that of the side walls and around a core member;

there being a longitudinally extending slot in the bottom wall of the housing, enabling the wheels located in the lower portion of said path which is adjacent to said bottom wall to rest on said cable or rod;

the bottom face of the core member having a central longitudinal downward projection of a width being somewhat narrower than the width of said grooves;

the number of wheels being such, that they essentially fill said path, permitting, however, a clearance between two adjacent wheels at said lower portion of the path; and the length of said lower portion of the path being such that it accommodates at least two wheels.

BRIEF DESCRIPTION OF THE DRAWINGS

FIG. 1 shows a side view of a device of the invention with one of the side faces of the housing removed;

FIG. 2 shows a cross-section through lines 2—2 in FIG. 1;

FIG. 3 shows a device in accordance with another embodiment viewed along the same section as that of the embodiment of FIG. 2;

FIG. 4 shows one of the pulley-like wheels of the device;

FIG. 5 shows a cross-section through lines 5—5 in FIG. 4;

FIG. 6 shows a wheel in accordance with another embodiment viewed along the same section as that of the embodiment of FIG. 5.

FIG. 7 shows a bottom-face member of a core member of the device; and

FIG. 8 shows a cross-section through lines 7—7 in FIG. 6; and

DETAILED DESCRIPTION OF THE INVENTION

The invention will now be described with reference to a non-limiting specific embodiment depicted in the annexed drawings. It will readily be appreciated by the artisan that various modifications of the enclosed embodiments are possible within the scope of the invention as defined herein.

Reference is first being made to FIGS. 1 and 2 showing a device in accordance with one embodiment of the invention. The device 10 has a housing 12 having two side walls 14 and 16 (wall 16 has been removed from FIG. 1 to show the internal structure of the housing), end walls 18 and 20, bottom wall 22 and top wall 24. The housing has inside a core member 26 integral with one of the side walls which together with the housing defines a circumferential path 28 around the core member in a plane parallel to that of the side walls. The path holds a plurality of wheels 30. The bottom wall 22 has a longitudinally extending slot 32 enabling the wheels 30 located in the lower portion 34 of the path, to rest on cable 36.

The number of the wheels 30 inside path 28 is such that they almost entirely fill said path enabling, however, a certain clearance between the wheels present in the lower portion 34 of the path.

The device further comprises hanging means 39 attached to the housing by means of a pivot 40 and bushing sleeve 42 inside the core members and having a first vertical portion 44, a slanting intermediate portion 46 and a downward vertical portion 48 which is essentially below the wheels. Bottom portion 48 is provided with a hanging hole 50, and a front and rear holes 52 and 54 which latter two allow the device to be connected by means of a cable or rod to other similar devices to form a train of such devices.

Cable 36 will typically have supporting poles at regular intervals or in curves along the transport line. At such points, the cable or rod rests on a support and in order to allow for the passage of the device over such supports, there should be sufficient distance between the bottom walls 22 of the device and top point of the vertical bottom portion 48 of the hanging means.

Attention is now being directed to FIG. 3 showing a slight modification of the embodiment of FIG. 2. In this embodiment hanging means 39' are integral with and extending from side wall 14' of the device.

Attention is now being directed to FIGS. 4 and 5 showing a wheel 30. Such a wheel which is typically made of a plastic material, has on its peripheral face a groove 52 which has a width, depth and shape allowing it to accommodate a cable or rod and also two cylindrical areas 73 and having a diameter D (FIGS. 5 and 6) on both sides of the groove (which has a diameter d) allowing the wheel to roll upon the core member 26 or the faces 74 of bottom face element 56. In order to reduce wear and increase strength, the wheels have preferably a metal hub 54 integrally inserted during the molding process.

Attention is now being directed to FIG. 6 showing another embodiment of a wheel wherein the non-grooved portions of the circumferential face of the wheel 70 are covered with an elastic layer 72 such as a rubber which allows for a more smooth operation.

As can be seen in FIGS. 1 or 2, the bottom face of core member 26 is fitted with a bottom face element 56 suitably made of a plastic material. This bottom face element has a downward projecting member 58 which has a width which is slightly less than that of groove 52 in wheel 30. Thereby, the wheels inside the housing are prevented from sideways movement inside the path and thus friction with the side walls is avoided.

Member 56 has an essentially straight section 60 and two peripheral, gradually arcuate sections 62 and 64. The arcuate sections enable an even distribution of the load on the wheels when the device rolls over a suspended cable and a smooth rolling of a wheel off and on to the bottom face element. The length of the straight section is sufficient to carry the load even when the device is situated on a rod which cannot resume an arcuate position as in the case of a cable which latter allows a more even distribution of the load between a larger number of wheels.

In order to explain the manner of operation, attention is directed again to FIG. 1. The device in this figure is illustrated as moving towards the right and during such movement the wheels which are engaged between the bottom face element and the cable are rotating clockwise. In this manner they slowly roll and advance, relative to the core member, in a direction opposite to that of the direction of movement. As can be seen, there is a small clearance between each of the wheels in the lower portions of the path, this clearance being important as it avoids friction which could have been caused if the wheels would have touched one another. When the wheel gets to the rearward portion of the core member, the left side in FIG. 1, it disintegrates from the cable and the bottom face element and the clearance between this wheel and the following wheel (on its right) is closed, whereby it pushes this wheel together with the cascade of wheels in the upper portion of the path are pushed in the clockwise direction. Consequently, a wheel at the right-most part of the upper portion of the path falls downward and thereby pushes the wheel below it and causes it to engage between the cable and the bottom face element. The fraction of time until a wheel is pushed by the next wheel whereby it becomes also engaged, ensures the clearance between two adjacent wheels.

I claim:

1. A device adapted for hanging loads and transporting them along a suspended cable or rod, comprising a housing having two parallel side walls, a bottom wall, a top wall and two end walls;

a core member arranged in an interior of said housing;

a plurality of identical wheels situated in said housing interior, said housing interior defining a circumferential path in which the wheels freely move in a plane parallel to that of the side walls and around said core member;

each of said wheels having a width which is narrower than the distance between the two side walls and on its peripheral face, a groove which has a width, depth and shape allowing it to accommodate said cable or rod, and two cylindrical areas on both sides of said groove;

said bottom wall having a longitudinally extending slot such that the wheels located in a lower portion of said path adjacent to said bottom wall rest on said cable or rod; a bottom face of the core member having a central longitudinal downward projection of a width being somewhat narrower than the width of said grooves;

said cylindrical areas of said wheels on both sides of said groove engaging with said bottom face of said core member to allow said wheels to roll against said bottom face of said core member;

the number of said wheels essentially filling said path but providing a clearance between adjacent pairs of said wheels at said lower portion of the path; and the length of said bottom portion of the path being such that it accommodates at least two of said wheels.

2. A device according to claim 1 wherein said bottom face of said core member is defined by a bottom face element inserted at the bottom side of said core member between said core member and said wheels.

3. A device according to claim 1, wherein the bottom face of the core member is straight in its middle portion and is somewhat arcuate towards its front and rear ends.

4. A device according to claim 1, wherein the non-groove portions of the peripheral face of the wheels is covered by an elastic material.

5. The device of claim 1, further comprising hanging means coupled to said housing for receiving a load.

6. The device of claim 5, wherein said hanging means are fixedly connected to at least one of said side walls of said housing.

7. The device of claim 5, wherein said hanging means and one of said side walls constitutes a single member such that said hanging means extend from said one of said side walls.

8. The device of claim 1, wherein said core member is formed integral with one of said side walls.

9. The device of claim 1, wherein at least one of said wheels has a metal hub incorporated therein, said metal hub being adapted to engage with said cable or rod.

10. The device of claim 1, wherein only said cylindrical areas of said wheels on both sides of said groove engaging with said bottom face of said core member are covered by an elastic material.

* * * * *